United States Patent
Newman et al.

(10) Patent No.: US 10,255,351 B2
(45) Date of Patent: Apr. 9, 2019

(54) MULTI-FACETED SOCIAL NETWORK SYSTEM FOR USE WITH PLURAL APPLICATIONS

(71) Applicant: Microsoft Corporation, Redmond, WA (US)

(72) Inventors: Todd D. Newman, Mercer Island, WA (US); James H. Lewallen, Fall City, WA (US); Colleen G. Estrada, Bellevue, WA (US); Rajeev V. Karunakaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 14/210,391

(22) Filed: Mar. 13, 2014

(65) Prior Publication Data

US 2015/0261851 A1    Sep. 17, 2015

(51) Int. Cl.
*G06F 17/30* (2006.01)
*H04L 12/58* (2006.01)

(52) U.S. Cl.
CPC .. *G06F 17/30699* (2013.01); *G06F 17/30867* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 2008/0288582 A1 | 11/2008 | Pousti et al. | |
| 2009/0228296 A1* | 9/2009 | Ismalon | G06Q 30/02 705/319 |
| 2010/0049534 A1 | 2/2010 | Whitnah et al. | |
| 2010/0083222 A1 | 4/2010 | Maximilien et al. | |
| 2010/0114788 A1* | 5/2010 | White | G06Q 30/02 705/319 |
| 2011/0004831 A1* | 1/2011 | Steinberg | H04N 21/454 715/753 |
| 2011/0083101 A1* | 4/2011 | Sharon | G06F 21/6245 715/800 |

(Continued)

FOREIGN PATENT DOCUMENTS

WO    2011041176 A1    4/2011

OTHER PUBLICATIONS

"Developer Community Management," available at <<http://www.soa.com/solutions/developer-community>>, accessed on Mar. 13, 2014, SOA Software, Inc., Los Angeles, CA, 7 pages.

(Continued)

*Primary Examiner* — Christopher J Raab
(74) *Attorney, Agent, or Firm* — Rainier Patents, P.S.

(57) ABSTRACT

A social network system (or other type of hosting system) is described herein which allows different types of applications to interact with the common resources of the system via respective application-specific channels. Through an application-specific channel, a user may obtain a filtered set of content items (e.g., posts) and notifications that pertain to a particular application with which the user is currently interacting. But the user may also obtain items and notifications that do not necessarily have an affiliation with the particular application. The social network system may maintain a single identity for each user across all application channels hosted by the system.

20 Claims, 12 Drawing Sheets

(56) References Cited

U.S. PATENT DOCUMENTS

| | | | |
|---|---|---|---|
| 2011/0196855 A1* | 8/2011 | Wable | G06F 17/30631 707/711 |
| 2012/0158715 A1* | 6/2012 | Maghoul | G06F 17/30867 707/728 |
| 2012/0216130 A1 | 8/2012 | Porro et al. | |
| 2012/0239763 A1* | 9/2012 | Musil | G06Q 50/01 709/206 |
| 2012/0330786 A1 | 12/2012 | Paleja et al. | |
| 2013/0073568 A1* | 3/2013 | Federov | G06F 17/30867 707/749 |
| 2013/0074032 A1 | 3/2013 | Barragan et al. | |
| 2013/0132883 A1* | 5/2013 | Vayrynen | G06F 3/0482 715/773 |
| 2013/0191416 A1* | 7/2013 | Lee | G06F 17/30979 707/771 |
| 2013/0297694 A1* | 11/2013 | Ghosh | H04L 67/02 709/204 |
| 2014/0006423 A1* | 1/2014 | Melnychenko | G06F 17/3053 707/749 |
| 2014/0149215 A1* | 5/2014 | Rajaram | G06F 17/30616 705/14.54 |
| 2014/0244621 A1* | 8/2014 | Lindsay | G06F 17/30699 707/722 |
| 2014/0280058 A1* | 9/2014 | St. Clair | G06F 17/3087 707/722 |
| 2015/0112990 A1* | 4/2015 | van Os | G06F 17/30412 707/737 |
| 2015/0113007 A1* | 4/2015 | Hatchard | G06Q 10/00 707/754 |

OTHER PUBLICATIONS

"Mashant," available at <<http://www.mashant.com/what-is-mashant/>>, accessed on Jan. 12, 2014, 2 pages.

Matte, Mike, "Quepasa Launches Developer Interface and Open Social Sandbox," available at <<http://www.prnewswire.com/news-releases/quepasa-launches-developer-interface-and-open-social-sandbox-65993472.html>>, PR Newswire, Oct. 26, 2009, 1 page.

"So.cl," available at <<http://en.wikipedia.org/wiki/So.cl>>, accessed on Mar. 13, 2014, Wikipedia entry, 2 pages.

* cited by examiner

MULTI-FACETED SOCIAL NETWORK SYSTEM FOR USE WITH PLURAL APPLICATIONS

BACKGROUND

An application developer may wish to integrate social network features into an application being developed. To accomplish this goal, the application developer can integrate with an existing general-purpose social network system, where that system provides a common user experience to a relatively large and diverse group of existing users. Alternatively, the application developer can create an entirely new social network system for use with the application, building such a system, so to speak, "from the ground up." These solutions, however, may have respective drawbacks.

SUMMARY

A social network system provides common resources and plural channels. Applications of different types may interact with the common resources via the plural respective channels. For example, consider a user who is currently interacting with a particular application. That user may use an application-specific channel to obtain a filtered set of content items (e.g., posts) and notifications that pertain to the particular application. But the user may also navigate outside a native application domain to obtain items and notifications associated with other applications, or all applications.

According to another illustrative aspect, the social network system maintains a single identity for each user across all application channels hosted by the social network system.

According to another illustrative aspect, the social network system may receive content items (such as posts) that are generated by users in the course of interacting with different applications. Each such item may be given a tag that reflects its association with the application from it originated or is otherwise affiliated.

According to another illustrative aspect, a hosting system is described which offers a multi-faceted service to users via plural channels in the manner described above. But, here, the service does not necessarily pertain to a social network service. For example, the hosting system offers a shopping-related service.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computer system for providing a multi-faceted social network service or other type of multi-faceted hosting service. Section B sets forth illustrative methods which explain the operation of the computer system of Section A. Section C describes illustrative computing functionality that can be used to implement any aspect of the features described in Sections A and B.

Figure 20:
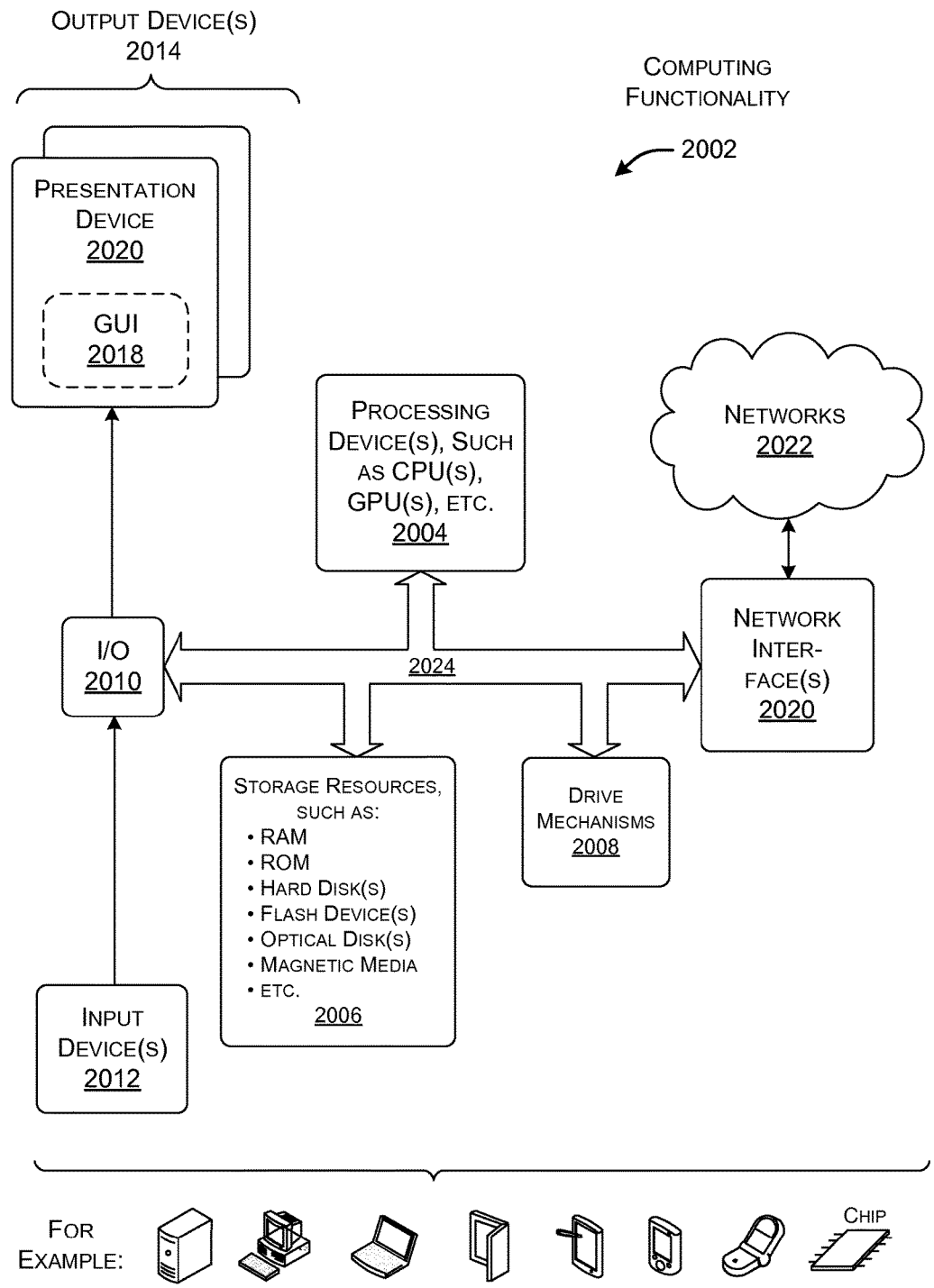
FIG. 20 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 20, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Further, any description of a single entity is not intended to preclude the use of plural such entities; similarity, a description of plural entities is not intended to preclude the use of a single entity. Finally, the terms "exemplary" or "illustrative" refer to one implementation among potentially many implementations.

A. Illustrative Computer System

Figure 1:
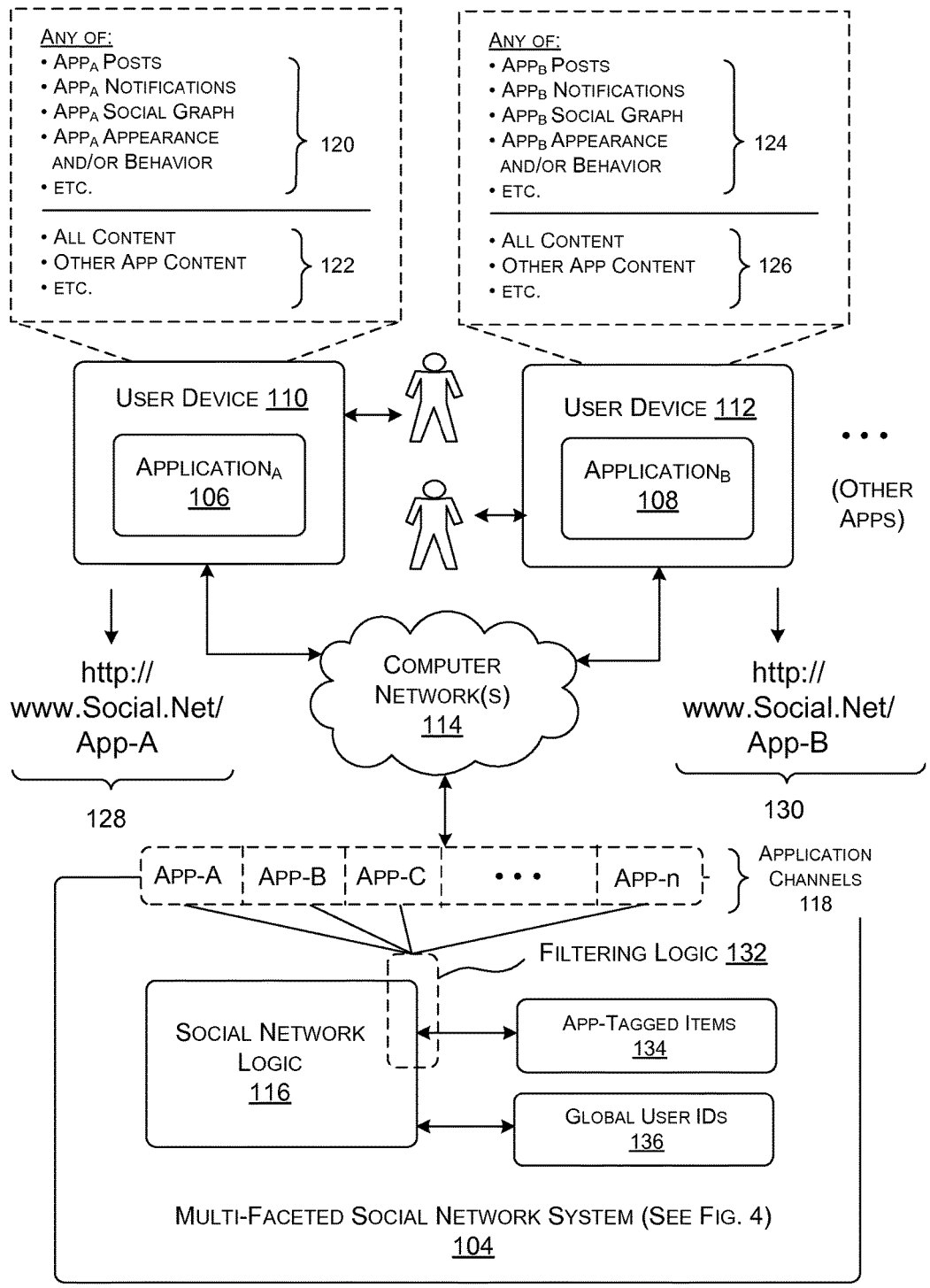
FIG. 1 shows an environment in which plural applications interact with a multi-faceted social network system.

FIG. 1 shows an environment 102 in which plural applications interact with a multi-faceted social network system 104. That is, FIG. 1 shows two representative applications, namely application $App_A$ 106 and application $App_B$ 108, although any number of different types of applications may interact with the social network system 104.

Figure 2:
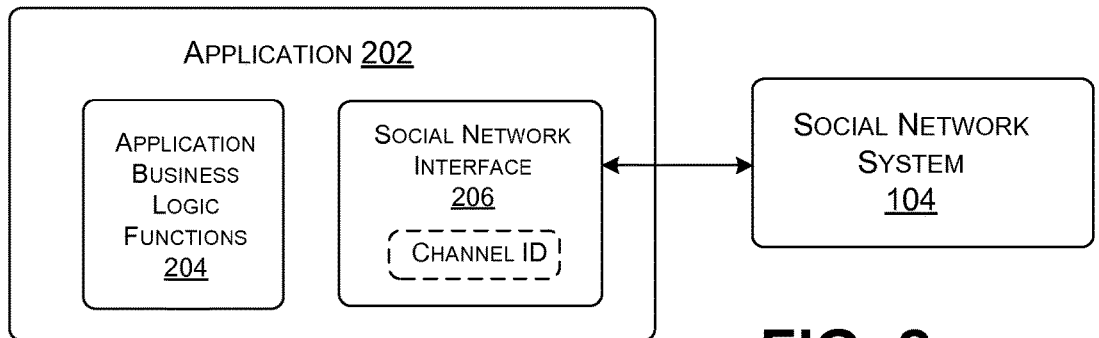
FIG. 2 shows one implementation of an application that may interact with the social network system of FIG. 1.
Figure 3:
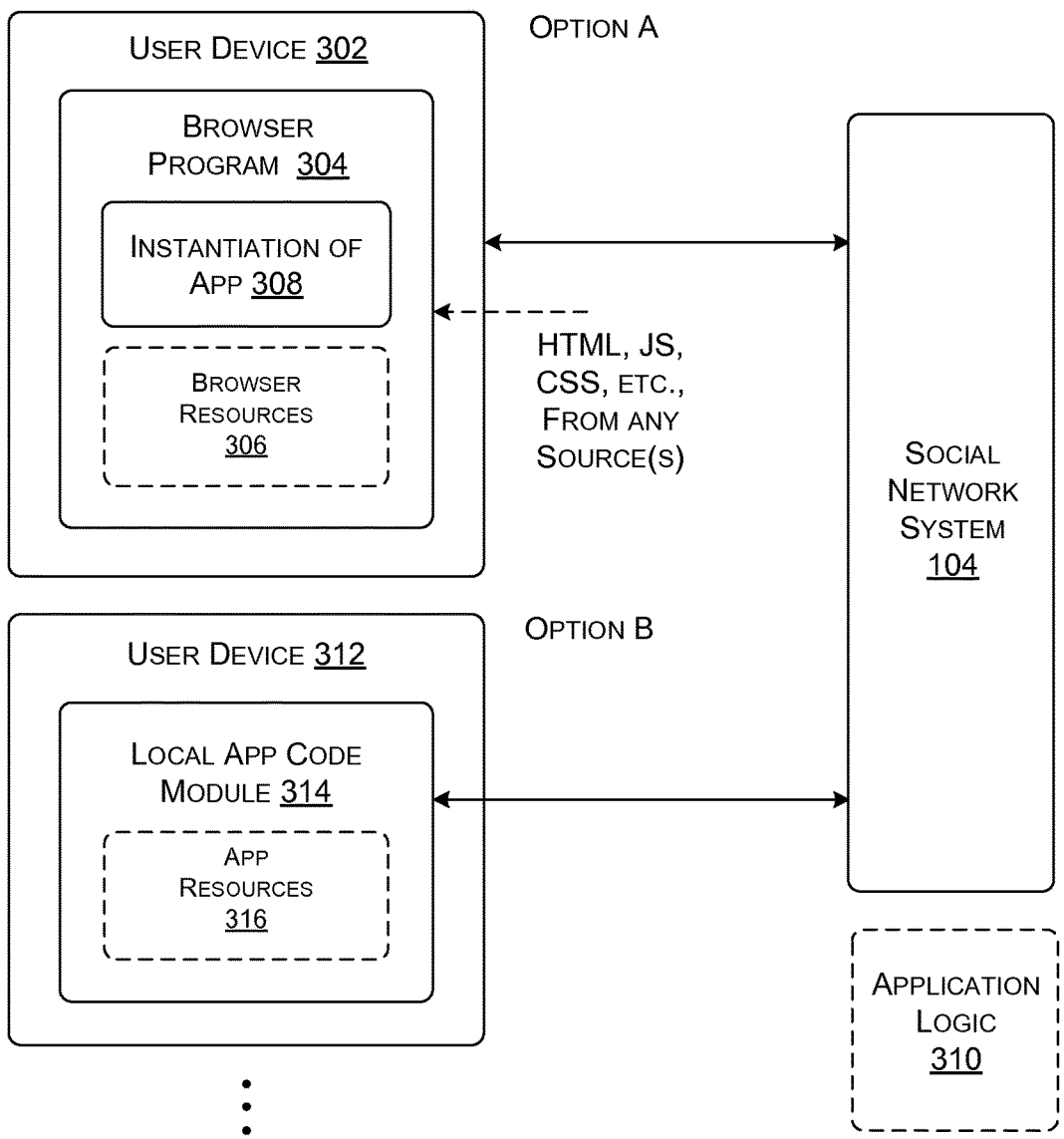
FIG. 3 shows different technologies that may be used to implement the application of FIG. 2.

The applications perform any function in any manner. For example, one type of application may allow users to create computer games. Another type of application may allow a user to create images or videos. Another type of application may allow a user to create music, and so on. FIGS. 2 and 3, explained below, provide further information regarding illustrative implementations of applications.

Any user devices may be used to interact with the applications, including, but not limited to: desktop personal computing devices, laptop computing devices, game console devices, set-top boxes, smartphones, personal digital assistant devices, tablet-type computing devices, media consumption devices (e.g., music-playing devices, book reader devices, etc.), wearable computing devices, smart appliances and devices, and so forth. In the context of FIG. 1, a first user interacts with application $App_A$ 106 using a first user device 110, and a second user interacts with application $App_B$ 108 using a second user device 112.

The user devices (110, 112, . . . ) may interact with the social network system 104 via one or more computer networks 114. For example, the computer network(s) 114 may comprise a local area network, a wide area network (such as the Internet), point-to-point links, and so on, or any combination thereof.

The social network system 104 itself may be implemented by one or more servers and associated data stores, provided at a single location or distributed over plural locations. A single entity may administer the social network system 104, or a combination of entities may administer the social network system 104.

The social network system 104 hosts social network logic 116 which implements different functions that, together, make up a social network service. More specifically, as the term is used herein, a social network service includes a suite of core functions that, at a minimum, allow users to create and view user-generated content, such as posts. The social network service also allows users to manage social graphs. A social graph may identify relations among users, as specified by the users. For example, with respect to a particular user, the social graph may maintain linking information that identifies a collection of users that the particular user has designated as contacts (e.g., as friends). The social graph may also maintain linking information that specifies a collection of users (e.g., followers) who have designated the particular user as a contact.

The social network service may also include one or more optional features. For example, a social network service may include notification functionality that sends a notification to a particular user when an event occurs that is relevant to the user, such as when a friend comments on a post authored by the user. As another optional feature, a social network service may accommodate direct communication among users of the social network service, e.g., through one-on-one communication or multi-person communication among two or more people. These optional social network features are cited by way of example not limitation; other implementations of the social network service may provide yet other functionality to their users.

The social network logic 116 constitutes a common resource that is available to all applications. Hence, all applications may interact with the social network logic 116, but they do so, by default, via a plurality of application-specific channels 118. For example, the application $App_A$ 106 interacts with the social network system 104 via an $App_A$ channel, the application $App_B$ 108 interacts with the social network system 104 via an $App_B$ channel, and so on.

An application channel provides a user with a user experience that is customized to suit a particular application. For instance, the social network system 104 may offer a filtered set of items and notifications to a user via an application-specific channel. Those items and notifications pertain to a particular application, with which the user may be interacting at the current time. In addition, or alternatively, the social network system 104 may customize the appearance and/or behavior of its service, to suit the particular application.

In addition, however, the social network system 104 may allow a user to interact with other facets of the social network service outside the domain associated with the particular application. For example, a user may make intra-application requests to obtain items associated with applications other than the particular application with which the user is currently interacting.

For example, in the context of FIG. 1, the user who interacts with application $App_A$ 106 may receive, by default, an application-specific user experience 120 that pertains to application $App_A$ 106. That experience 120 may include any of: presentation of $App_A$-specific posts, delivery of $App_A$ notifications, interaction with an $App_A$-specific social graph, interaction with an $App_A$-specific user interface appearance and/or behavior, and so on. The user may also receive, on request, an intra-application user experience 122. That experience 122 may include, for example, the presentation of items pertaining to a specific application (or applications) other than application $App_A$ 106 (such as application $App_B$ 108), or the presentation of all items without regard to application of origin.

Similarly, the user who interacts with application $App_B$ 108 may receive, by default, an application-specific experience 124 that pertains to application $App_B$ 108. That experience 124 may include any of: presentation of $App_B$-specific posts, delivery of $App_B$-specific notifications, interaction with an $App_B$-specific social graph, interaction with an $App_B$-specific user interface appearance and/or behavior, and so on. The user may also receive, on request, an intra-application user experience 126. That experience 126 may include, for example, the presentation of items pertaining to a specific application (or applications) other than application $App_B$ 108 (such as application $App_A$ 106), or presentation of all items without regard to application of origin.

Stated in other words, the channels provide a default portal though which applications may interact with the social network system 104. But users may also break out of the domains associated with the channels and interact with other content and experiences hosted by the social network system 104. For example, the user who interacts with application $App_A$ 106 can view the content items provided by application $App_B$ 108, even though that user may not have application $App_B$ installed on his or her user device 110, and vice versa. At the same time, if the user is not interested in this non-native application content, he or she is not given it.

In operation, an application may select a user experience associated with a particular channel by specifying an identifier associated with that channel. In one illustrative case, the identifier of each channel corresponds to a network address assigned to the channel, such as a Uniform Resource Locator (URL). For example, the application $App_A$ 106 contacts its channel of the social network system 104 by specifying a URL 128, while the application $App_B$ 108 contacts its channel of the social network system 104 by specifying a URL 130. A detection module (not shown in FIG. 1) provided by the social network system 104 detects the network address of an incoming request, to provide detected channel information.

In another case, all applications interact with the social network system 104 via the same network address. Here, an application can identify a particular channel by sending a channel-specific code to the social network system 104, e.g., in every interaction with the social network system 104 or just an initial communication with the social network system 104. The social network system 104 can deliver a channel-specific service to the application based on the presentation of the channel-specific code.

Upon detecting the channel, in whatever manner conveyed, the social network system 104 may deliver a customized user experience to the user based on the detected channel information. To perform this task, the social network system 104 uses filtering logic 132 to identify a subset of items, maintained in a data store, which pertain to the detected channel. More specifically, the data store may maintain a plurality of items 134. Each item in the data store may include a tag which indicates the application from which it originated or is otherwise affiliated. The filtering logic 132 can extract that subset of items having tags associated with a particular channel (and its associated application). In addition, the social network system 104 may use the filtering logic 132 to provide channel-specific notifications to a user. In addition, the social network system 104 may customize the appearance and/or behavior of the user interface presentations that are provided to the user in a channel-specific manner.

The social network system 104 may maintain global IDs 136 for users of the social network service. A global ID identifies a user across all channels of the service. Hence, a user may specify his or her global ID to interact with any application domain. In other words, in one implementation, a user is not asked to present domain-specific credentials upon navigating to specific application domains.

The social network system 104 offers potential benefits to both application developers and end users. From the perspective of application developers, the social network system 104 provides a framework by which the developers can conveniently and quickly incorporate social network features into their applications, that is, without incurring the expense and effort of building custom social network services from "the ground up." The social network system 104 can also reduce the expense and effort associated with maintaining and managing social network features. At the same time, the social network system 104 empowers individual application developers to create custom channels, that is, without subjecting the developers to unwanted social network information and functionality. The social network system 104 also empowers application developers (and application administrators) to maintain control over the channels, once created. From the perspective of end users, the social network system 104 provides a useful and enjoyable way of interacting with communities of individuals centered on the shared use of particular applications. Yet the social network system 104 is also flexible in that it gives end users the opportunity to explore out-of-domain information and functionality, if they desire such resources, and to expose their application-centric contributions to a wider community of users.

FIG. 2 shows one implementation of an application 202 that may interact with the social network system 104 of FIG. 1. The application 202 may provide code that implements one or more application business logic functions 204. The application business logic functions 204 implement whatever core task(s) the application 202 was designed to perform, such as creating and/or playing a game, etc. The application 202 may also provide a social network interface 206 by which the application 202 integrates with the functionality of the social network system 104.

More specifically, the application 202 may identify a particular application channel via the social network interface 206, e.g., by specifying a particular URL. The application 202 also passes information to the social network system 104, and receives information from the social network system 104, via the social network interface 206. In some cases, the application 202 provides the functionality which controls the appearance and behavior of the user interface presentations through which information is exchanged with the social network system 106. In other cases, social network system 104 provides the functionality which controls the appearance and behavior of these presentations. In still other cases, a combination of the application 202 and the social network system 104 controls the appearance and behavior of the presentations. For example, the social network system 104 can provide parameters which control at least some aspects of the appearance and behavior of the presentations, but the application 202 otherwise implements those presentations.

For example, consider an application which allows a user to create a game, and then discuss the game with a community of game creators via a social network experience. The application business logic functions 204 may correspond to whatever code the application uses to create the game. In one non-limiting implementation, the social network interface 206 may implement calls to one or more Application Programming Interfaces (APIs) by which the application 202 interacts with the services of the social network system 104. For example, one such API may allow a user to upload a post to the social network system 104 that provides a link to a game that he or she has created using the application 202. Another API may allow a user to receive posts of other game players, which may provide links to their games. In this example, the application 202 may include the functionality which governs the appearance and behavior of the user interface presentations through which information is exchanged with the social network system 104. But, as noted above, the application 202 can also rely on the social network system 104 to provide these presentations, in whole or in part.

Further consider the scenario in which the social network system 104 controls at least some aspects of the appearance and behavior of the user interface presentations pertaining to the social network experience, e.g., either by specifying parameters which control the presentations, and/or by providing functionality which directly implements the presentations. In one approach, the application developer may contact the administrator of the social network system 104 and specify a list of design features which he or she would like to see in the social network service, as the service will appear in the context of the application that he or she is building. The administrator can then configure the service so that it meets the developer's demands, if possible. In another case, the social network system 104 may provide an interface to the application developer, which allows the developer to make these changes himself or herself.

FIG. 3 shows different technologies that may be used to implement the application 202 of FIG. 2. In a first case, a user device 302 provides a browser program 304 that runs based on browser resources 306. The browser resources 306, for instance, may correspond to a library of code modules. The browser program 304 may run an instance of an application 308 using the browser resources 306. More specifically, in one case, the browser program 304 may generate the instance of the application 308 based on HyperText Markup Language (HTML) information that governs the content and layout of the application 308, Cascading Style Sheets (CSS) information that governs the stylistic appearance of the application 308, JavaScript® information that governs the behavior of the application 308, and so on. That executable information, in turn, may originate from one or more sources, which may be local to the user and/or remote from the user. For instance, the information that is used to provide one or more application business logic functions may originate from the user device 302 and/or from remote application logic 310 (e.g., as provided by one or more remote servers). The information that is used to provide the social network features may originate from the user device 302, the remote application logic 302, and/or the social network system 104.

In a second case, a user device 312 provides a local application code module 314. The local application code module 314, in turn, may utilize application resources 316, which may constitute a library of code modules. The user device 312 executes the application code module 314 to provide an instance of the application. During execution, the application may interact with the social network system 104 in any manner specified above. For example, the application can use one or more APIs to send requests to the social network system 104, and, in response, receive information from the social network system 104. In another implementation, the application code module 312 may be distributed among two or more devices, any of which may be local with respect to the user and/or remote with respect to the user. For example, the application logic 310 can provide code which implements some aspects of the application, such as processor-intensive parts of the application.

The two implementations shown in FIG. 3 are set forth by way of example, not limitation. Still other ways of implementing a social network-enabled application are possible. For example, another implementation can combine the technical features of the first and second implementations set forth above, e.g., by providing a local application module which launches a web-enabled social network experience when requested.

Figure 4:
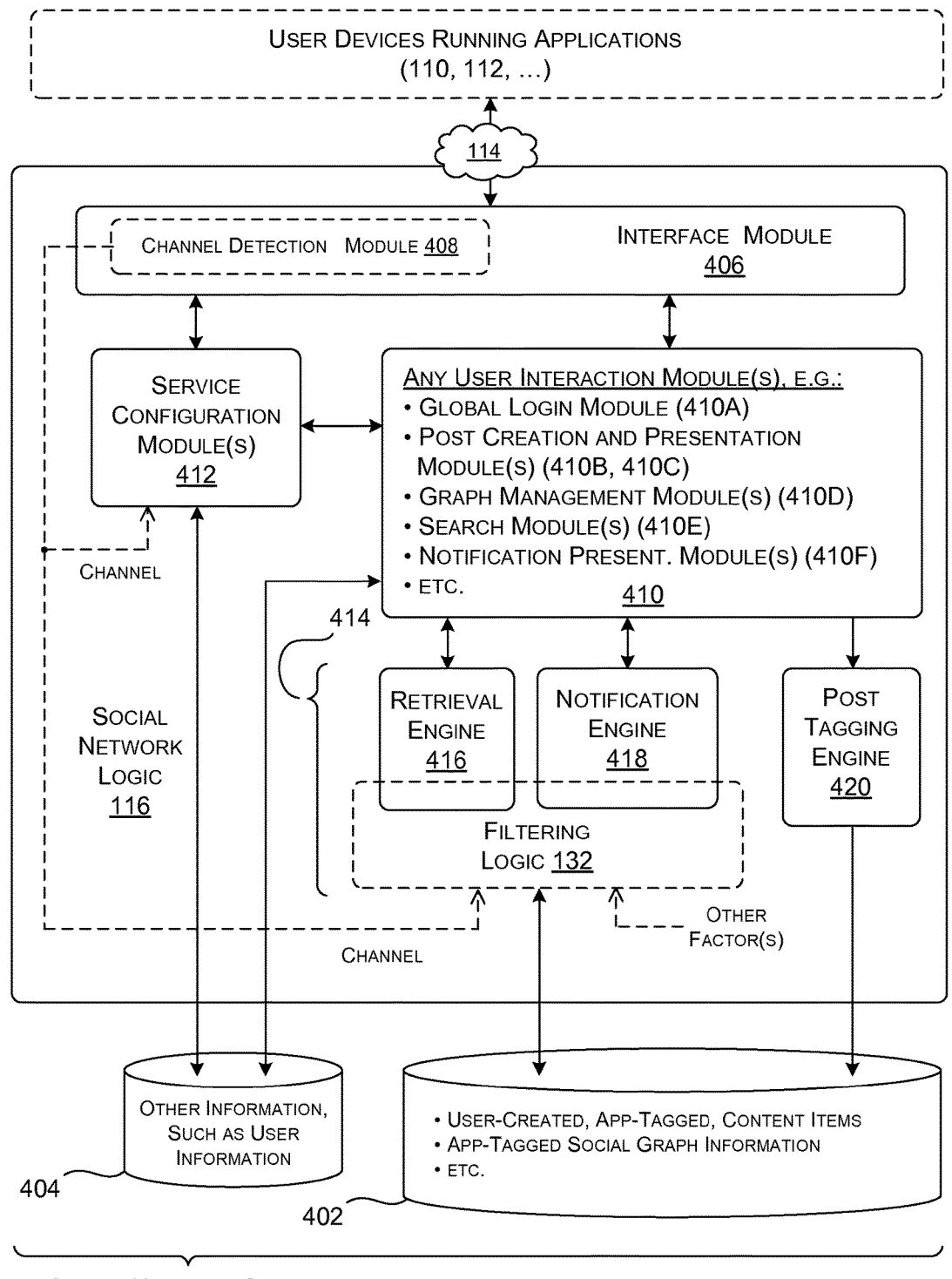
FIG. 4 shows one implementation of the social network system of FIG. 1

FIG. 4 shows one implementation of the social network system 104 of FIG. 1. From a high-level perspective, the social network system 104 includes the social network logic 116, which was introduced in the context of FIG. 1, and one or more data stores (402, 404, . . . ). These components constitutes common resources that are available to all applications (106, 108, . . . ).

The social network logic 116 includes an interface module 406 by which the social network logic 116 interacts with the applications (106, 108, . . . ). In some implementations, the interface module 406 may provide front-end functionality of any type, such as switches, load balancers, etc. The interface module 406 may also provide a channel detection module 408 which detects a channel identifier associated with an incoming request from an application. The channel identifier specifies the type of channel associated with the request. As explained above, the channel identifier may correspond to a network address (e.g., an URL) associated with the incoming request.

Further, in one implementation, in a setup operation, the social network system 104 issues each application an application ID and a secret key (or keys), or other type of identifying information. The recipient application and the social network system 104 henceforth use this application-identifying information to enable interaction with each other over the assigned channel.

The social network logic 116 also includes any collection of user interaction modules 410 which implement different functions of the social network service, with the cooperation of the applications. For example, the user interaction modules 410 may include a global login module 410A for signing a user into the social network system 104, using a global ID. That is, by default, the social network system 104 may launch a version of the social network service that is customized for the channel detected by the channel detection module 408. Yet the login is global, so that the user may navigate to another application domain hosted by the social network service, without being asked to log into that separate domain. The data store 404 may store the global ID information associated with plural users.

The user interaction modules 410 may also include one or more item creation modules 410B. These modules allow a user to create user-generated content items, such as posts. The user may also use the creation modules 410B to add supplemental information that pertains to already-created posts, such as comments, "likes," and so on. The creation modules 410B can allow the user to perform these tasks using any technique, such as presenting a template to the user having various fields; the user can then fill out the template to create a user-generated content item. The data store 402 may store all user-generated content that has been created by the users.

The user interaction modules 410 may also include one or more presentation modules 410C that allow a user to view user-generated content that has already been created. These modules 410C allow the user to visualize the user-generated content in the context of any specified "slice" through the user-generated data maintained in the data store 402, defined by one or more filtering factors. For example, in a channel-related dimension, the user can specify the channel (or channels) to which the user-generated content items pertain. In a creator-related dimension, the user can specify the entity which created the user-generated content items. For instance, the user can specify whether the items can be authored by anyone, just the current user, just the people to whom the current user follows, just the users whom follow the current user, the administrator of the service (via a featured collection of items), and so on. In an item-related dimension, the user can specify the type of items to be displayed. For example, in the context of a user profile page, the user can specify the type of content to be displayed, such as original posts, comments on other posts, likes, etc. Later figures and accompanying description provide examples of the various filtering criteria specified above.

The user interaction modules 410 may also include various graph management modules 410D that allow a user to manage his or her social graph, e.g., by adding contacts, removing contacts, blocking followers, etc. The graph management modules may store the changes made by users in the data store 402.

The user interaction modules 410 may also include one or more search modules 410E that allow a user to perform a search within the data store 402 by specifying any of the filtering factors identified above. In addition, the user can specify one or more alphanumeric search terms via the search modules 410E.

The user interaction modules 410 may also include one or more notification presentation modules 410F which alert the user to various events that affect the user, such as when another user makes a comment or enters a "like" that is directed to one of the user's posts.

The user interaction modules 410 may also include one or more communication modules (not shown) that allow users to communicate with each other through any technique, such as voice-over-IP, text-based interaction (such as instant messaging), etc.

The user interaction module 410 may also include one or more administrative modules (not shown) that allow an administrator and/or users to monitor and regulate interaction among participants of the social network service. For example, the administrative modules can address prohibited or non-preferred behavior by users. Each channel can potentially perform this administrative task in a custom manner. For example, different channels may appeal to different user communities; the administrative tools can therefore be tailored to address the characteristics of these different groups.

The above-described user interaction modules 410 are cited by way of example, not limitation; other implementations of the social network system 104 can provide additional user interaction modules, and/or can omit one or more of the modules described above. Further note that each user interaction module may work in conjunction with particular user interface presentations, through which users interact with these modules. In the manner explained above, the user interface presentations can be implemented by the user interaction modules 410 and/or by the applications, in whole or in part.

A configuration module 412 may optionally configure any aspect of any of the user interaction modules 410. In some cases, the configuration module 412 can tailor its configuration of an interaction module based on detected channel information. For example, with respect to the presentation modules 410C, the service configuration module 412 can specify the default posting information that is presented to a user upon first gaining access to the social network system 104. In one choice, the presentation modules 410C can be configured to present a time-ordered series of posts associated with the present application (and associated channel). In another choice, the presentation modules 410C can be configured to present a collection of the user's own posts with respect to the current channel, or all channels, and so on. The service configuration module 412 can also control the appearance and behavior of individual posts in any manner.

In one case, a system administrator may set up the configuration module 412 such that it produces a desired configuration for selected channels. In other cases, the configuration module 412 may provide a developer-facing interface which allows an application developer to make certain configuration selections for an application channel, for an application under development. In a simple case, for example, assume that the application developer wishes the posts which are to be embedded in his application to appear against a pink-colored background. The application developer may make this selection via the developer-facing interface of the service configuration module 412. The service configuration module 412 may set this option by choosing a parameter which selects the color pink. Alternatively, or in addition, as explained above, the developer may control some (or all) configuration choices via the application code itself, independent of the social network system 104, e.g., by including an instruction in the application that specifies that the posts delivered by the presentation modules 410C are presented against a pink background.

The social network logic 116 may also include one or more backend engines 414 that serve a support role to one or more of the user interaction modules 410. For example, a retrieval engine 416 retrieves user-generated content items from the data store 402. A notification engine 418 sends one or more notifications to the user upon the occurrence of various events. Both the retrieval engine 416 and the notification engine 418 provide output results subject to one or more filtering factors applied to the filtering logic 132. One such filtering factor may specify the application with which the user is currently interacting, or has otherwise specified. Other filtering factors were described above in the context of the explanation of the presentation modules 410C.

In one implementation, each application can apply tags to the user-generated content items that it sends to the social network system 104. Each tag identifies the application that was used to create the corresponding user-generated content item, or the application with which the user-generated content item is otherwise affiliated. Alternatively, a post tagging engine 420 can add such a tag to each user-generated content item prior to adding the user-generated content item to the data store 402.

Figure 5:
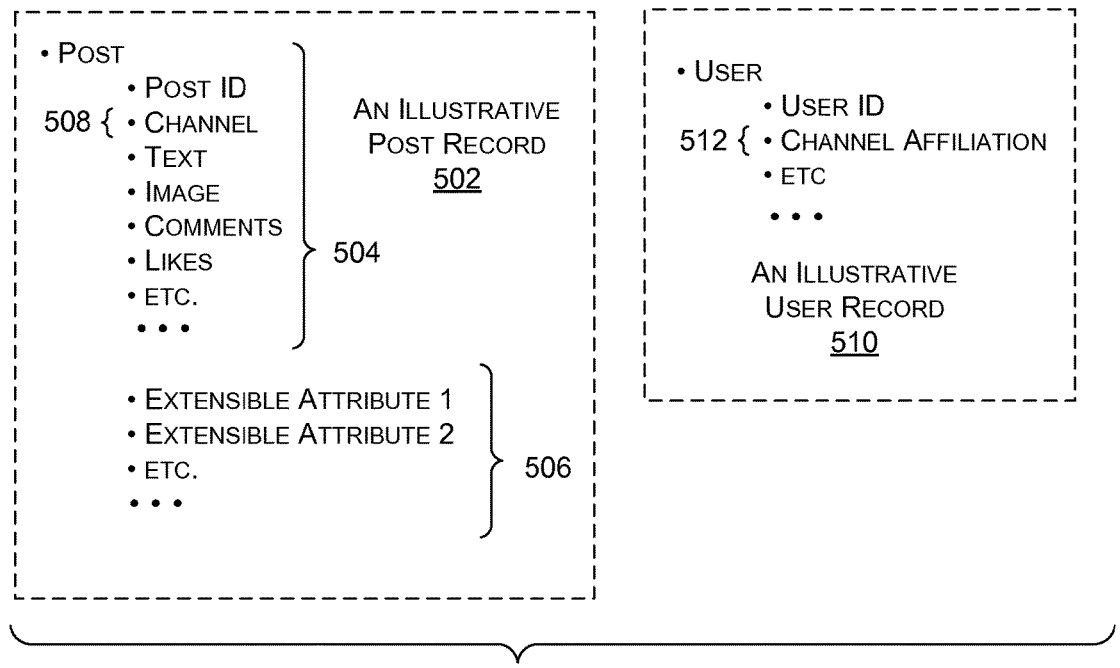
FIG. 5 shows different types of records that may be maintained by the social network system of FIG. 4.

FIG. 5 shows different types of records that may be maintained in the data store 402 of the social network system 104. For example, an illustrative record 502 for a post may contain a first set of attribute fields 504 that are the same for all applications, and another set of attribute fields 506 which are customized with respect to the application to which the post pertains.

For example, in one merely illustrative case, the first set of attribute fields 504 identifies the ID associated with the post, the channel associated with the post (as per attribute field 508), the text content associated with the post (if any), the image content associated the post (if any), any comments associated with the post, any likes associated with the post, and so on. All posts, regardless of channel affiliation, include these same attribute fields, and the attribute fields are interpreted in the manner specified above.

The second set of attribute fields identifies one or more extensible proprieties of a post. For example, for a game-created application, one extensible attribute field may provide a link to a storage location which stores a copy of game code associated with the post. This type of attribute field may not be common to other posts produced by other applications. In general, the extensible nature of a post record accommodates the development of new types of posts associated with yet-to-be-developed applications, without necessitated the re-engineering of the basic design principles of the social network system 104.

An application developer may also provide custom logic that is configured to interpret and interact with any information conveyed by the above-described custom attribute fields. For example, assume that an application allows users to create and interact with puzzles of a particular kind, such as crossword puzzles. The application may store puzzle-related information in one or more custom attribute fields of its post records. The application may also provide custom logic which is configured to retrieve and present this information, e.g., when a user issues an instruction to display a post that contains this information. The logic which performs these functions may reside anywhere with the environment shown in FIG. 3, such as on a user device, on the social network system, and/or on a remote server associated with the particular application.

A representative user record 510, associated with a particular user, may include a user ID attribute field, a channel affiliation attribute field 512, a post field which identifies the posts associated with the user, and so on. With respect to the channel attribute field 512, the user may identify himself or herself as being primarily affiliated with one or more applications. For example, a user who frequently uses a game application may choose to associate himself or herself with this game application. As will be described below, such a channel affiliation, if it exists, enables the filtering logic 132 to filter contacts within a person's social graph, e.g., by extracting a list of friends and followers who are associated with the game application.

Figure 6:
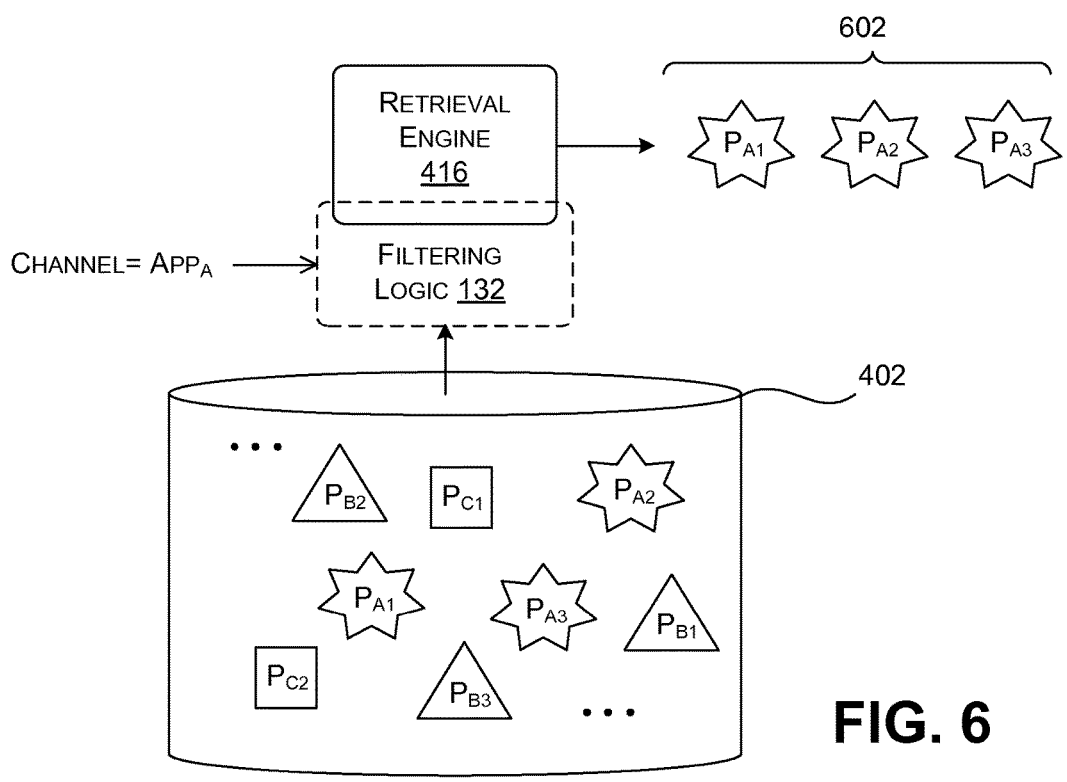
FIG. 6 shows one type of filtering operation that may be performed by the social network system of FIG. 4.

FIG. 6 shows one type of filtering operation that may be performed by the retrieval engine 416 of the social network system 104 of FIG. 4. Assume that the data store 402 contains a plurality of posts that were created by different applications. For example, the post bearing the label $P_{A2}$ was created by application $App_A$ 106 in FIG. 1. The post bearing the label $P_{B1}$ was created by application $App_B$ 108 in FIG. 1, and so on. In other cases, a post (or other user-generated item) may be affiliated with an application, although not necessarily created by that application. For example, a user may have an affiliation with application $App_A$. Any post that that user creates may optionally be designated as being affiliated with application $App_A$. In other cases, a post may be affiliated with two or more applications. In any case, the posts may include tags of any nature which reflect their respective channel affiliations. For example, as shown in FIG. 5, the channel attribute associated with the post record 502 may constitute a tag assigned to this post.

Further assume that the filtering logic 132 receives input which directs it to find all of the posts associated with application $App_A$ 106. For example, the channel detection module 408 may identify the channel associated with application $App_A$ 106 when the user first logs into the social network system 104 via application $App_A$. Or the user may have manually selected the channel associated with application $App_A$ 106 after logging in through some other portal. In response to the selection, in whatever manner made, the retrieval engine 416 retrieves at least posts $P_{A1}$, $P_{A2}$, and $P_{A3}$ from the data store 402, constituted a filtered set of items 602. A presentation module will present the filtered set of items 602 to the user for his or her viewing.

Figure 7:
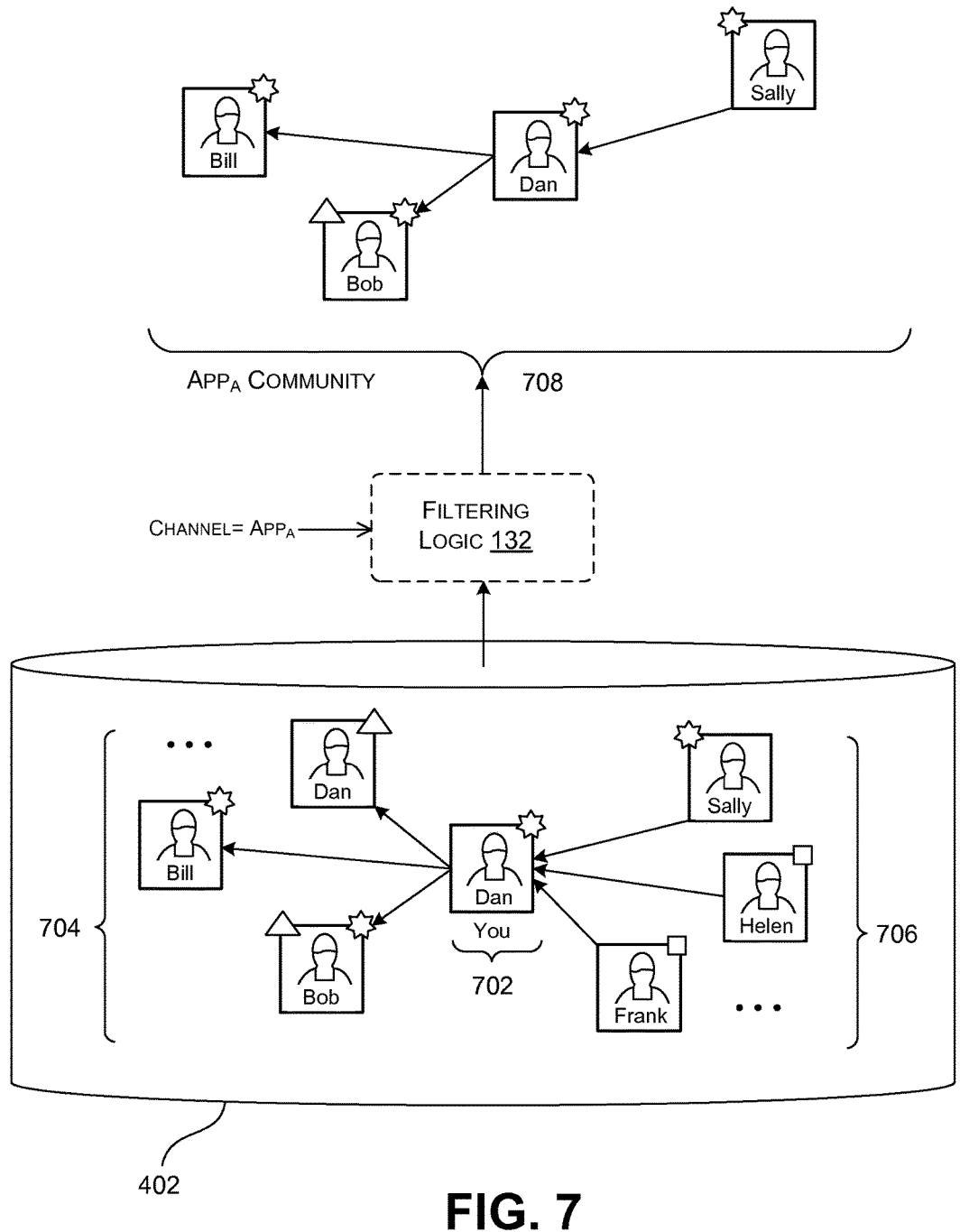
FIG. 7 shows another type of filtering operation that may be performed by the social network system of FIG. 4.

FIG. 7 shows another type of filtering operation that may be optionally performed by the filtering logic 132. For example, assume that the user has visited his or her user profile page. Further assume that the user wishes to view a list of the people associated with him or her, but only with respect to a local community associated with the application $App_A$ 106. Alternatively, the user may wish to view content items that have been created by the local community, etc.

To achieve this outcome, the data store 402 may store the user's full, application-agnostic, social graph. That graph includes a node 702 associated with the user, a set of nodes 704 associated with contacts established by the user, and a set of nodes 706 associated with people who follow the user. The nodes may optionally be tagged with channel affiliation attributes that indicate the self-designated application affiliation of the users. For example, the current user may have expressed an affiliation with application $App_A$ 106. In response to a filter selection, the filtering logic 132 extracts a subset 708 of the full social graph which contains only those nodes tagged as pertaining to the application $App_A$ 106. A user interaction module may then present information regarding the subset 708 to the user, such as by presenting a list of the users in the subset 708, or a collection of posts authored by that subset 708. The user may further restrict this subgraph to show only his or her contacts (e.g., friends), or only the people that follow the user.

FIGS. 8-11 show various user interface presentations that may be provided by the social network system 104 of FIG. 4. Starting with FIG. 8, assume that a user uses a user device 802 to interact with a particular application, such as an application $App_A$. In this scenario, now assume that application $App_A$ provides a dash-cam service. That is, the $App_A$ captures a short video vignette when commanded by the user to do so by voice activation, while the user device 802 is mounted in the user's vehicle. Referring to FIG. 2, such an application may include application business logic functions 204 which allow the application $App_A$ to respond to the user's commands, take the video vignette, etc. The application $App_A$ also includes a social network interface 206 which enables the user to interact with a community of users who also use the application $App_A$, and wish to share their experiences with others. The application $App_A$ may correspond to a web-enabled application (as per the top-most example of FIG. 3), or a local-implemented application module (as per the bottom-most example of FIG. 3), or some other application implementation.

Assume that, when the application $App_A$ first accesses the social network system 104, the channel detection module 408 determines that the application pertains to $App_A$. The service configuration module 412 may then instruct a presentation module to present a time-ordered series of posts associated with $channel_A$, the channel to which application $App_A$ pertains. This choice is cited by way of illustration, not limitation; the service configuration module 412 could have, instead, instructed the presentation module to provide a channel-agonistic collection of posts authored by the current user.

Figure 8:
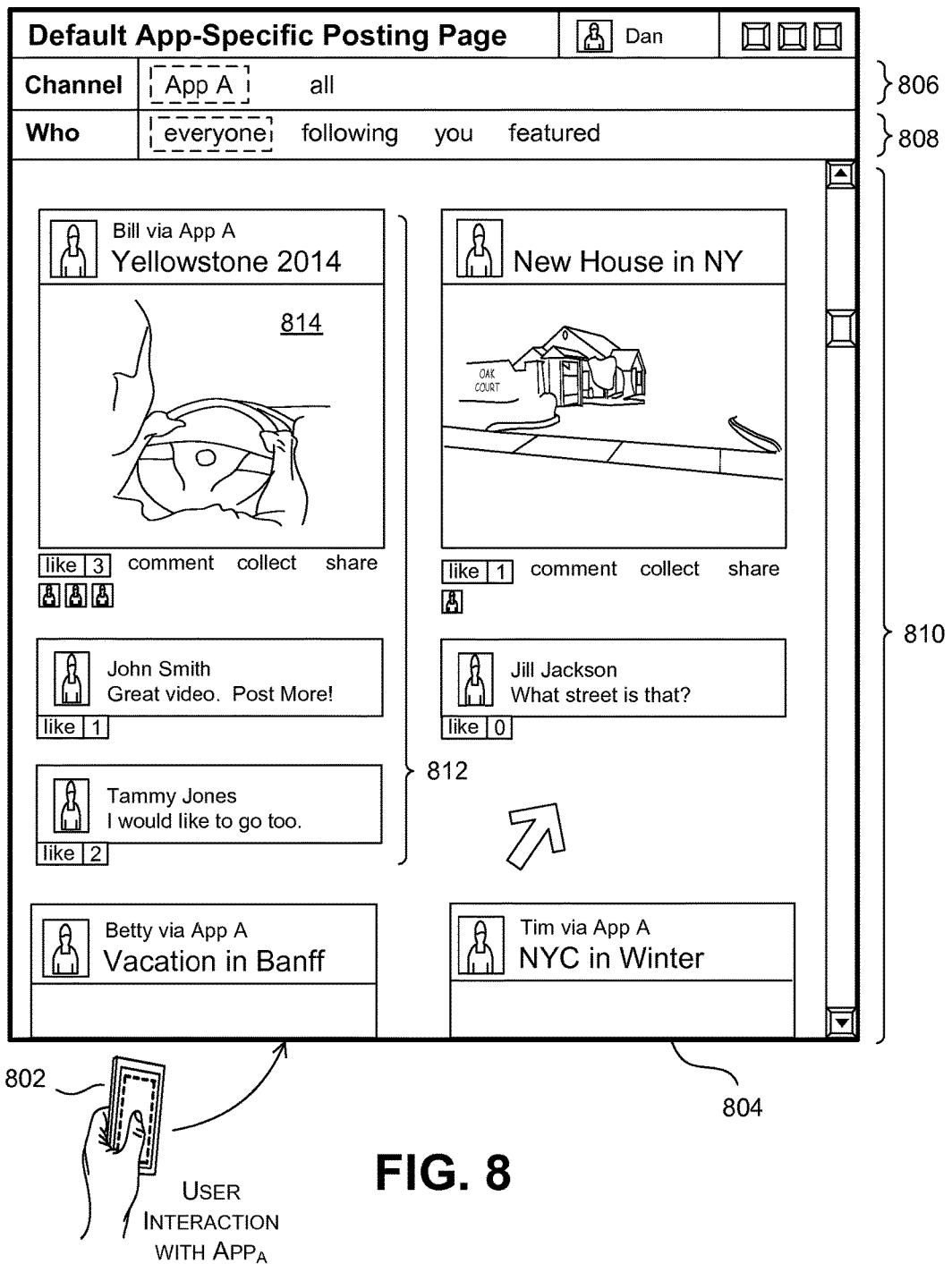
FIGS. 8-11 show various user interface presentations that may be provided by the social network system of FIG. 4.

In the specific example of FIG. 8, assume that the environment 102 provides the user interface presentation 804 shown to the user, for display on the user's user device 802. As explained in connection with FIGS. 2 and 3, the functionality which provides this user interface presentation 804 can be provided by one of the user interaction modules 410 of the social network system 104, and/or the application $App_A$, and/or some other logic source, and/or some combination thereof. In any case, all aspects of the appearance and behavior of this page are cited by way of example, not limitation.

The user interface presentation 804 includes a first filtering bar 806 that allows a user to filter the selection of posts in a channel-related dimension. For example, the first filtering bar 806 indicates that the posts currently pertain to application $App_A$, meaning that each post indicates that it originated from, or is otherwise associated with, application $App_A$. But the user may leave this application domain by selecting an "all" filter factor. In response to such a selection, the retrieval engine 416, in conjunction with the filtering logic 132, can retrieve a time-ordered list of posts created by any application, not just application $App_A$.

A second filtering bar 808 allows a user to filter the selection of posts in an creator-related dimension, e.g., by specifying the people or entities which created the posts. For example, the second filtering bar 808 currently indicates that the posts displayed in the user interface presentation 804 were created by anyone, without limitation. But the user may instead choose to view a subset of posts created by people whom he or she follows (e.g., corresponding to the user's friends), by selecting the "following" filter factor. Or the user may choose to view a subset of user-generated items that he or she has created (by selecting the "you" filtering factor). Or the user may choose to view a subset of posts chosen by the administrator of the social network system 104 (by selecting the "featured" filtering factor), and so on.

The user interface presentation 804 may include yet further filtering bars, allowing for filtering to be performed along additional dimensions. Further, in other implementations, the user interface presentation 804 may use other types of interface controls to solicit filtering selections from the user.

A main scrollable section 810 of the user interface presentation 804 displays a series of posts which match the filtering criteria chosen in the filtering bars (806, 808, etc.). The user interface presentation 804 may also present the posts according to one or more stylistic selections specified by the service configuration module 412 and/or by the application code. Those stylistic selections can specify any of: the arrangement of posts, the behavior of the posts, the sizes of the posts, the shapes of the posts, the fonts used by the posts, and so on.

A representative post 812 shown in the main section 810 includes main post content 814. That main post content 814 corresponds to the initial post submission (entered by a hypothetical user named "Bill"). The main post content 814 may include a snapshot of a video vignette captured by Bill, together with a textual caption. The post 812 may further include "likes," conveying the number (and identities) of the people who indicated that they liked Bill's post. The post 812 may also include zero, one, or more comments entered by anyone pertaining to Bill's post. To repeat, the particular appearance, structure, and behavior of this post 812 is presented in the spirit of exemplary illustration, not limitation.

Figure 9:
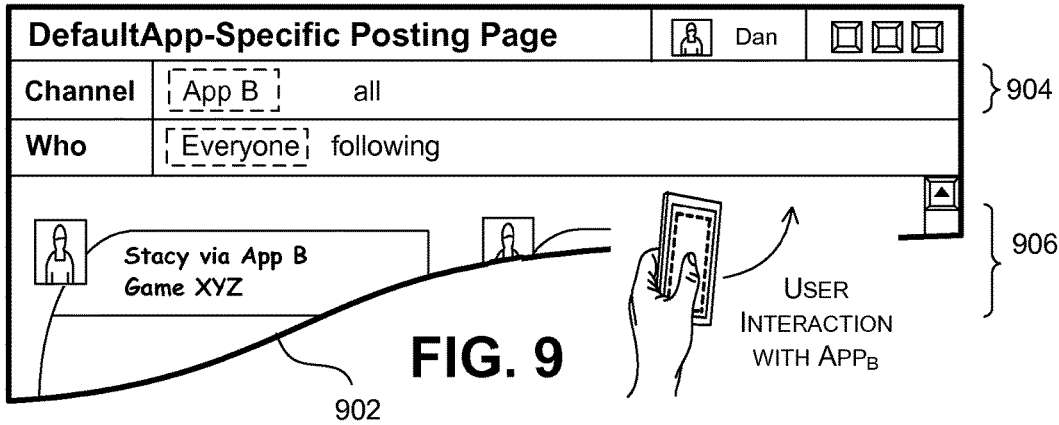

FIG. 9 conveys that the environment 104 can offer another type of user interface presentation 902 to a user when that user interacts with another application, such as application $App_B$. That user interface presentation 902 may include a channel filtering bar 904, which indicates that the posts in the user interface presentation 902 initially pertain, by configurable default, to application $App_B$. But the filtering bar 904 also gives the user the option to navigate outside the confines of the domain associated with application $App_B$, e.g., by selecting the "all" entry in the filtering bar 904.

FIG. 9 also indicates that the environment 102 may use a different style to present the individual posts within a main section 906, compared to the case of FIG. 8. For example, the posts may have a different shape, font, color, etc. compared to the posts shown in FIG. 8.

Figure 10:
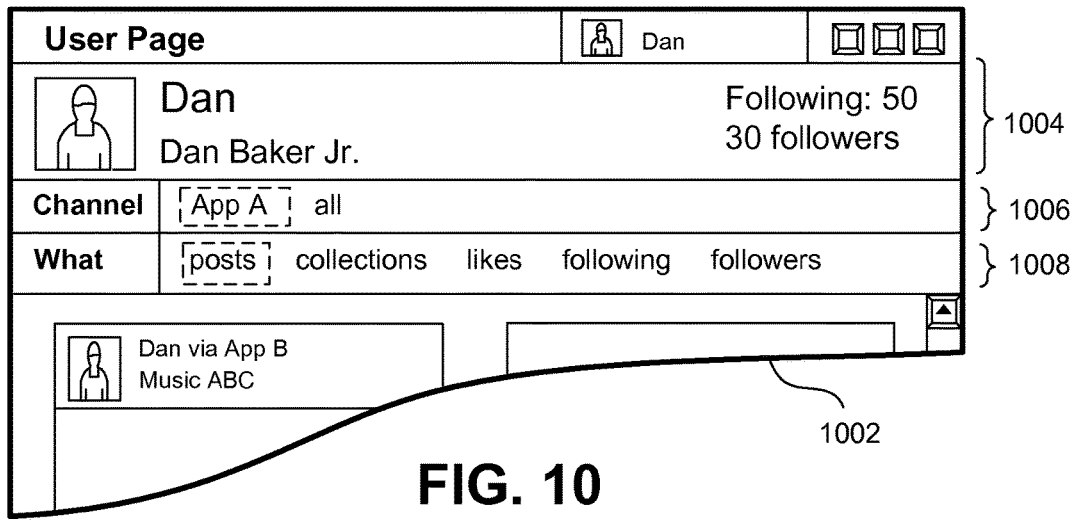

Assume at this juncture that the user, a hypothetical person named "Dan," opts to visit his profile page, which presents information associated with his user profile. FIG. 10 shows a user interface presentation 1002 that results from such a selection. In this case, the user interface presentation 1002 may include an introduction section 1004 that provides high-level information regarding the user in question, Dan. The user interface presentation 1002 may also include a first filtering bar 1006 that allows the user to filter the presentation of user-generated items in a channel-related dimension. The user interface presentation 1002 may include a second filtering bar 1008 that allows the user to filter the user-generated items along an item-type dimension. In the present example, the user has chosen to view posts that he has created using the application $App_A$. But the user may navigate to another "slice" of the information maintained in the data store 402 by changing the filtering selections in any manner.

Figure 11:
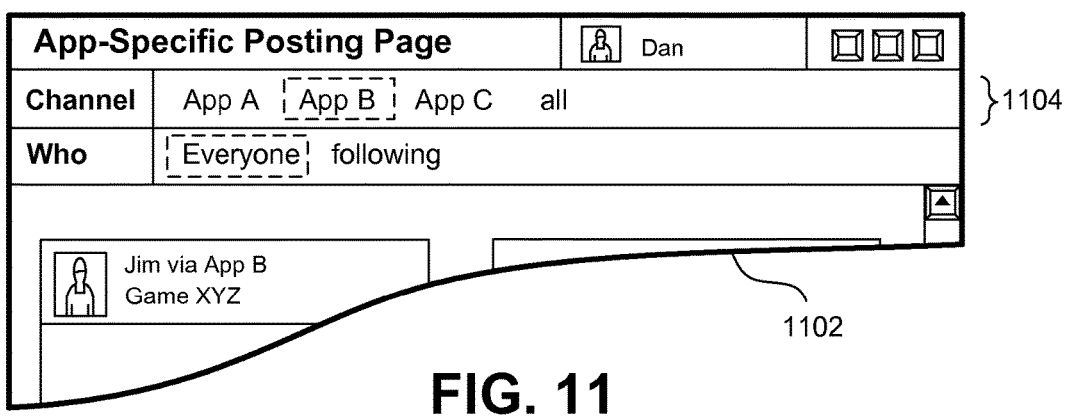

FIG. 11 shows a user interface presentation 1102 having a filtering bar 1104 that allows a user to navigate to specific application domains, outside the content of the native application domain associated with application $App_A$. For example, the user can also examine posts associated with application $App_B$, application $App_C$, and so on, or view all posts without respect to application-related affiliation. By advancing from one application domain to another, the environment 102 may change any of: (a) the set of items that are displayed; (b) the stylistic appearance of the items; and/or (c) the behavior of the items, etc.

In all of the above examples, the applications pertain to discrete application modules that perform respective application functions. For example, one such application allows a user to create a specific type of game. The social network system 104 allocates a channel to each such application. In another case, the social network system 104 may also allocate a channel to a specified class of applications. A class may be defined on any basis, such as common function, common developer, common rating, common demographics of appeal, etc.

Figure 12:
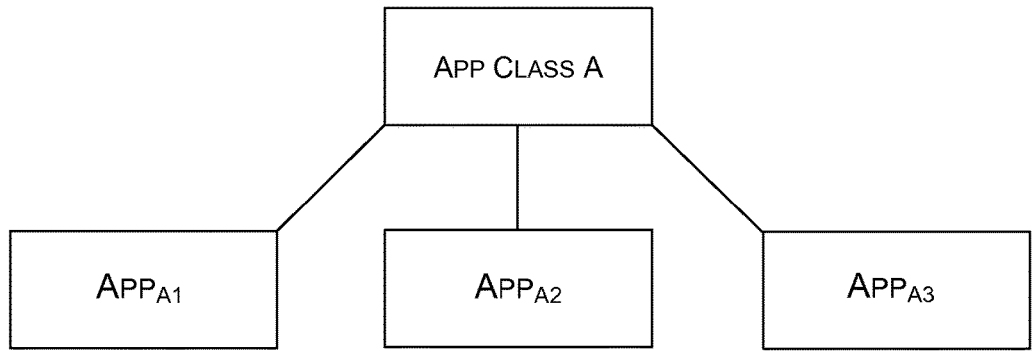
FIG. 12 shows a hierarchy of applications, any of which may be assigned to an application channel by the social network system of FIG. 4.

For example, consider the simplified example of FIG. 12. The social network system 104 may host channels for the specific application modules corresponding to application $App_{A1}$, application $App_{A2}$, and application $App_{A3}$. Assume that all three applications are related in terms of common function. For example, assume that all three applications allow users to create games of different types. If so, the social network system 104 may also assign a higher-level application channel associated with application class A. In other cases, the social network system 104 can maintain a hierarchy of applications (and application classes) having any level of complexity, e.g., by having any number of levels and branches. The leaf nodes of such a hierarchy may correspond to actual applications with which users may interact.

Figure 13:
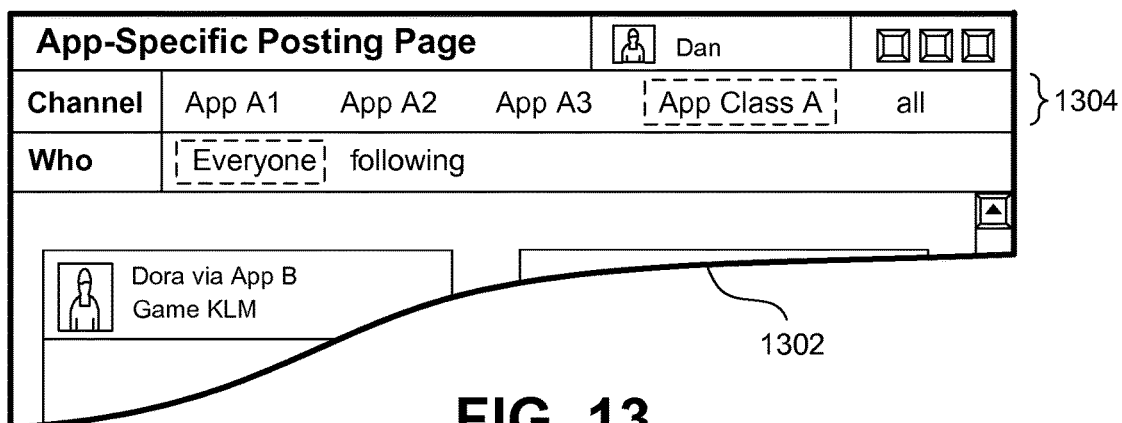
FIG. 13 shows a user interface presentation that may be provided by the social network system of FIG. 4 to interact with any of the applications identified in FIG. 12, including an application class that is associated with multiple such applications.

FIG. 13 shows a user interface presentation 1302 having a filtering bar 1304 that allows a user to choose from among all four channels described above in FIG. 12, including a channel associated with application class A. If the user chooses the "class A" option, the retrieval engine 416, in conjunction with the filtering logic 132, can display an aggregation of all the posts created by users via application $App_{A1}$, application $App_{A2}$, and application $App_{A3}$. The service configuration module 412 can choose a consistent presentation style for the class A channel, such that all posts in the aggregation have a consistent appearance and behavior. Or the social network system 104 may display each individual post according to its native appearance and behavior (meaning, for a post created by a particular application, the appearance and behavior of the post as it would appear in the channel that is dedicated that particular application alone).

In one case, an administrator can establish the type of high-level channels described above. Alternatively, or in addition, the social network system 104 may empower individual users to set up the higher-level channels. That is, the social network system 104 may provide the tools that allow the users to create these types of channels.

In a related scenario, the environment 102 can assign two or more applications, associated with a family of applications, to the same channel. In this case, the social network system 104 would treat all such applications as if they constituted a single application. In other words, the social network system 104 could not discriminate the content and experience provided by one application in the family of application from another application in the family.

The filtering logic 132 can control the presentation of other type of information, besides user-generated content (e.g., posts, comments, likes, etc.). For example, the filtering logic 132 can control the presentation of notifications on an application-specific basis (and/or on the basis of any other filtering factor(s)). Further, as illustrated in connection with FIG. 7, the filtering logic 132 may also select parts of a user's social graph based on the affiliations of the users in the graph (and/or on the basis of any other filtering factor(s)).

Figure 14:
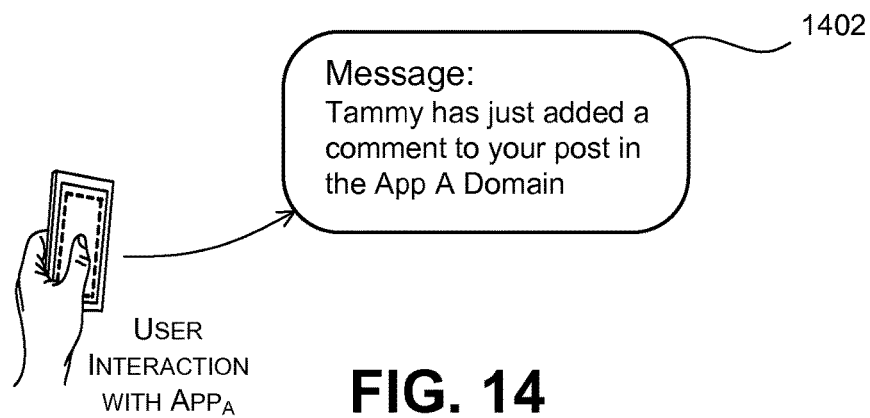
FIG. 14 shows a notification that may be generated by the social network system of FIG. 4.

In the scenario of FIG. 14, for example, assume that the user is currently interacting with an application $App_A$. The filtering logic 132 can present only those notifications that pertain to application $App_A$, such as by presenting notifications only when other users make submissions to this channel, or, more restrictively, only when users make submissions to this channel that pertain to the user's own posts. Notification 1402 is one such application-specific notification.

Figure 15:
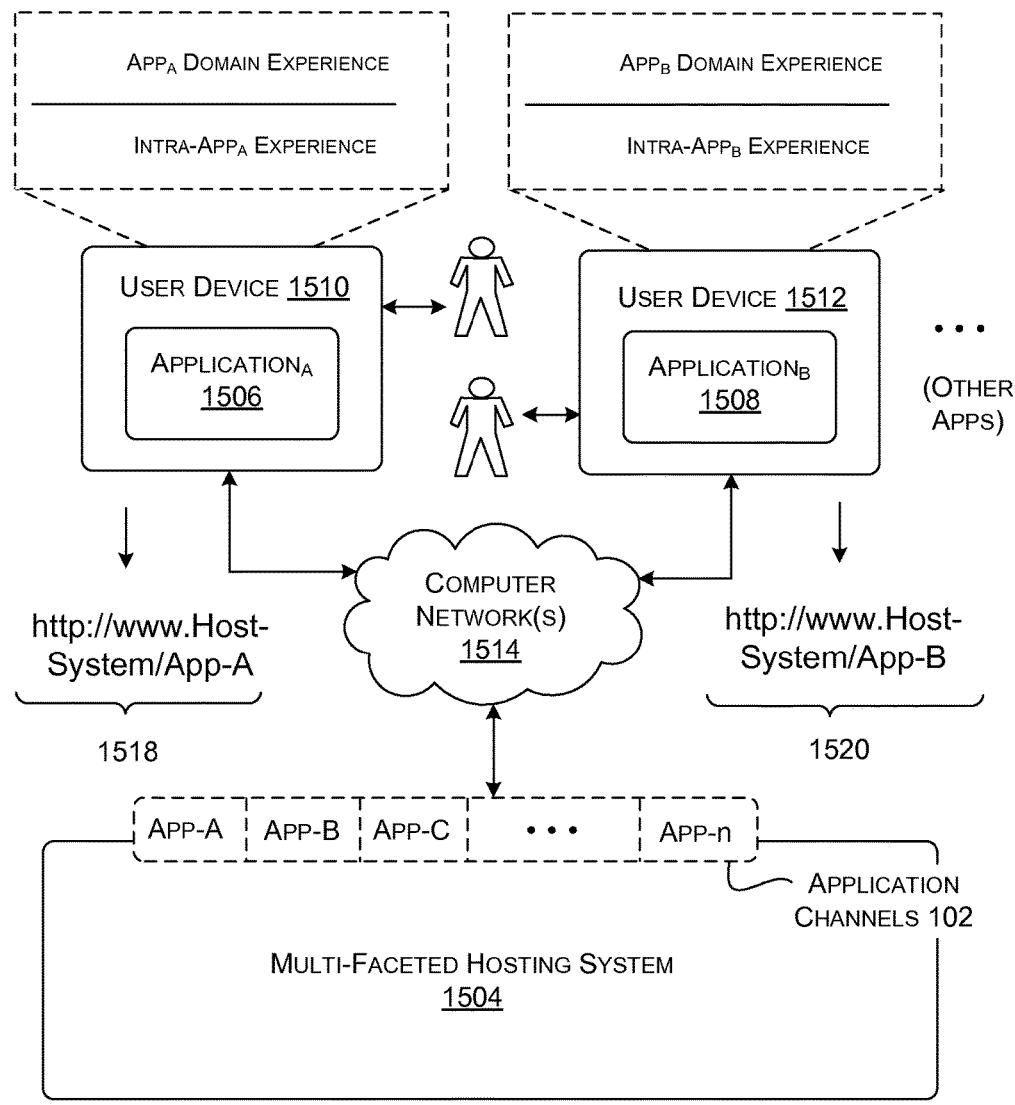
FIG. 15 shows an environment in which plural applications interact with a multi-faceted hosting system, where the hosting system can host any type of service.

FIG. 15 shows an environment 1502 in which plural applications interact with a multi-faceted hosting system 1504, where the hosting system 1504 can host any type of service. More specifically, the environment 1502 represents an example in which the principles set forth above, in the context of a social network service, are extended to other types of services.

In one case, for instance, the hosting system 1504 provides a multi-faceted shopping service by which individual users may post information regarding items for sale. The shopping service may also provide functionality which allows sellers to consummate purchases with buyers. Here, users may use different types of applications to interact with the common resources of the shopping system. The shopping service may assign each such application an application channel. The shopping system may then offer a customized experience to users based on the applications (and associated channels) that they use to interact with the shopping service. This type of service does not meet the definition of a social network service provided above because it does not necessarily maintain a social graph that links together users of the shopping service.

In any case, the environment 1502 allows any number of applications (e.g., application $App_A$ 1506, application $App_B$ 1508, . . . ) running on respective user devices (e.g., user device 1510, user device 1512, . . . ) to interact with the hosting system 1504 via a computer network 1514. The hosting system 1504 interacts with the separate applications (1506, 1508, . . . ) via respective channels. As before, the hosting system 1504 can identify the channel affiliation of the applications (1506, 1508, . . . ) based on the network addresses (1518, 1520, . . . ) through which the applications (1506, 1508, . . . ) contact the hosting system 1504.

The user of application $App_A$ 1506 may interact with the hosting system 1504 via a domain associated with application $App_A$ 1506. Or that user may navigate to any other application domain or domains. The same is the case with respect to the user who interacts with application $App_B$ 1508. That is, the user of the application $App_B$ 1508 may choose to interact with the hosting system 1504 via the domain associated with application AppB 1508, or via any other domain or domains.

B. Illustrative Processes

FIGS. 16-19 show procedures that explain one manner of operation of the social network system 104 of Section A. Since the principles underlying the operation of the social network system 104 have already been described in Section A, certain operations will be addressed in summary fashion in this section. Further, although not expressly stated below, the principles set forth in this section also apply to the more general environment 1502 of FIG. 15, where a hosting system 1504 provides any type of multi-faceted hosting service, not necessarily a social network service.

Figure 16:
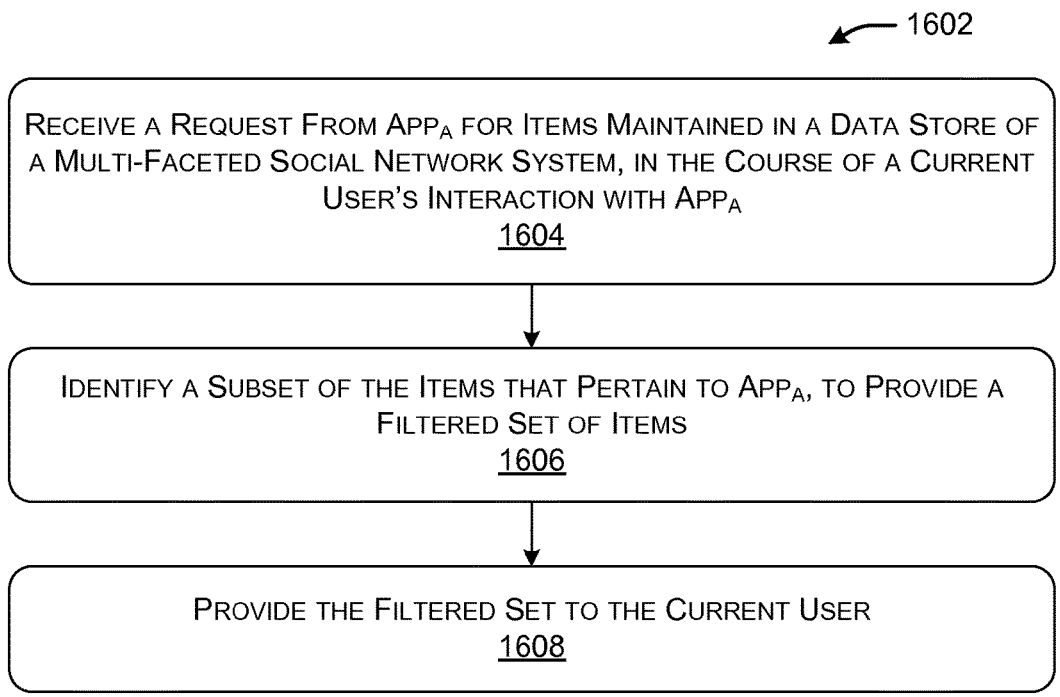
FIG. 16 is a procedure which describes one way that the social network system (of FIG. 4) can provide a filtered set of items that pertain to a particular application.

To begin with, FIG. 16 shows a procedure 1602 which describes one way that the social network system 104 (of FIG. 4) can provide a filtered set of items that pertain to a particular application, such as application $App_A$ 106 of FIG. 1. In block 1604, the social network system 104 receives a request, by a particular application, for items maintained in the data store 402 of the social network system 104, in the context of a current user's interaction with the particular application. In block 1606, the social network system 104 identifies a subset of items that pertain to the particular application, to provide a filtered set of items. In block 1608, the social network system 104 provides the filtered set of items to the user.

Figure 17:
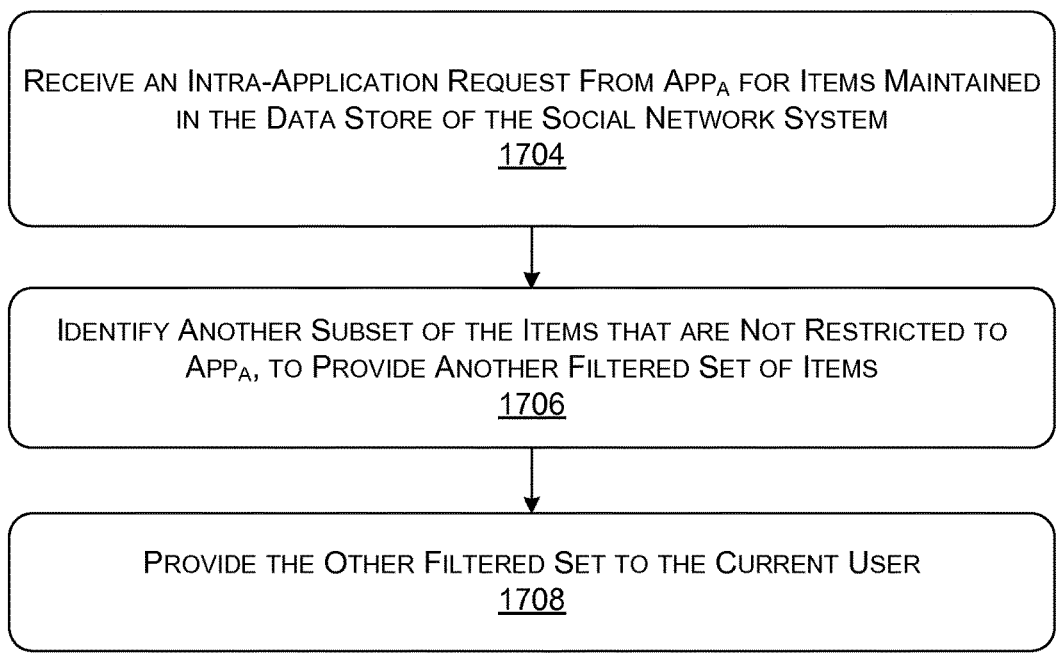
FIG. 17 is a procedure which describes one way that the social network system (of FIG. 4) can provide a filtered set of items that do not necessarily pertain to a particular application with which a user is currently interacting.

FIG. 17 is a procedure 1702 which describes one way that the social network system 104 can provide a filtered set of items that are not necessarily associated with the particular application (e.g., application $App_A$) with which a user is currently interacting. In block 1704, the social network system 104 receives an intra-application request from a particular application for items maintained in the data store 402 of the social network system 104. In block 1706, in response to the intra-application request, the social network system 104 identifies another set of items that are not restricted to the particular application. In block 1708, the social network system 104 provides the other set of items to the user.

Figure 18:
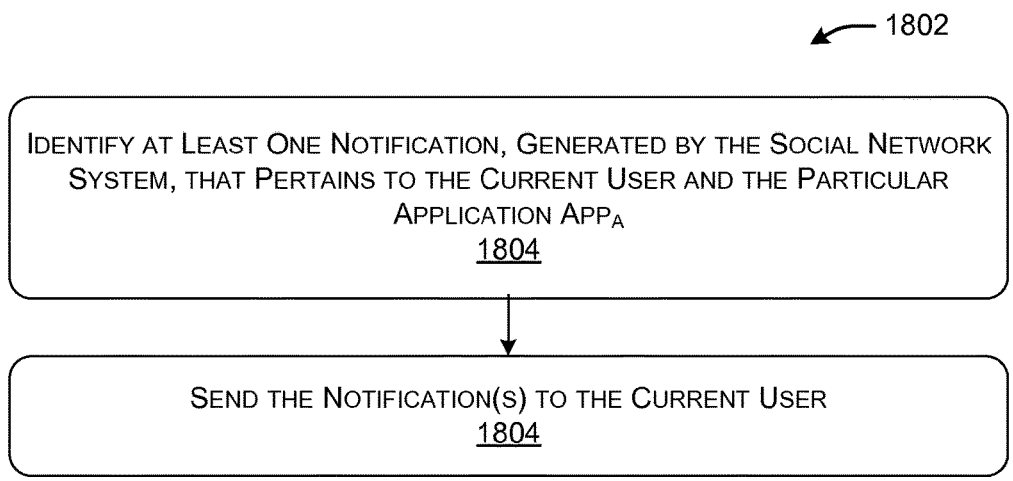
FIG. 18 is a procedure which describes one way that the social network system (of FIG. 4) can provide one or more notifications to a user in the course of the user's interaction with a particular application.

FIG. 18 is a procedure 1802 which describes one way that the social network system 104 can provide one or more notifications to a current user in the course of the user's interaction with a particular application (e.g., application $App_A$). In block 1804, the social network system 104 identifies at least one notification, generated by the social network system 104, that pertains to: (a) the current user; and (b) the particular application. In block 1806, the social network system 104 sends the notification(s) to the user in a course of the user's interaction with the particular application.

Figure 19:
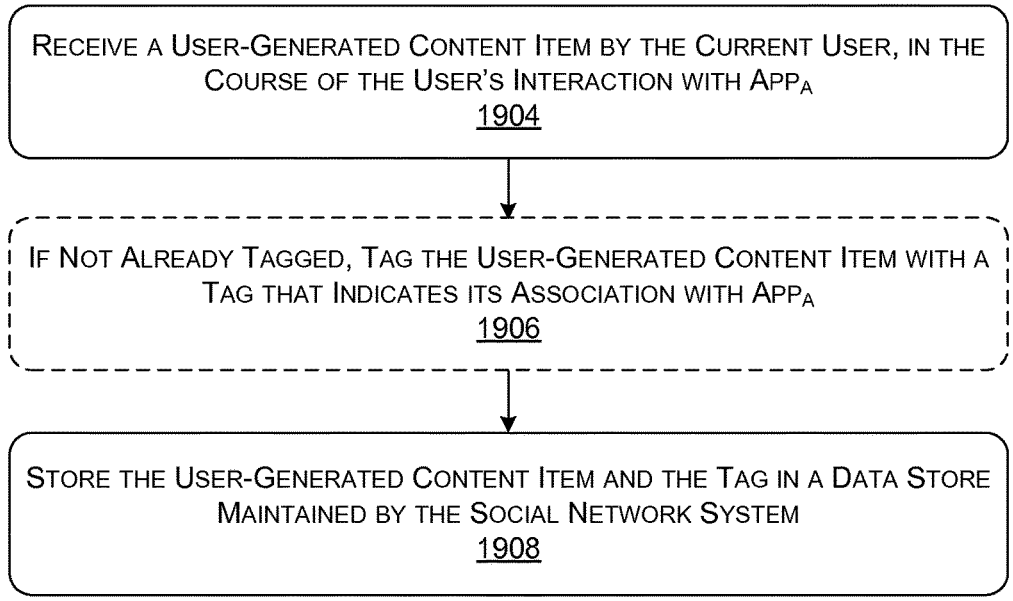
FIG. 19 is a procedure which describes one way that the social network system (of FIG. 4) can store user-generated content items and associated application-specific tags in a data store maintained by the social network system.

FIG. 19 is a procedure 1902 which describes one way that the social network system 104 can store user-generated content items and associated application-specific tags in the data store 402. In block 1904, the social network system 104 receives a user-generated content item (e.g., a post, a comment, etc.) by the current user, in the context of the user's interaction with a particular application (e.g., application $App_A$). The user-generated item is accompanied by a tag, provided by the particular application, that indicates an association between the user-generated content item and the particular application. Alternatively, in block 1906, the social network system 104 can use the tagging engine 420 (of FIG. 4) to apply the tag the user-generated content item. In block 1908, the social network system 104 stores the user-generated content item, and its tag, in the data store 402.

C. Representative Computing Functionality

FIG. 20 shows computing functionality 2002 that can be used to implement any aspect of the environments (102, 1502) of FIGS. 1 and 15. For instance, the type of computing functionality 2002 shown in FIG. 20 can be used to implement any aspect of the social network system 104 of FIG. 1, the hosting system 1504 of FIG. 15, any user devices of FIGS. 1 and 15, and so on. In all cases, the computing functionality 2002 represents one or more physical and tangible processing mechanisms.

The computing functionality 2002 can include one or more processing devices 2004, such as one or more central processing units (CPUs), and/or one or more graphical processing units (GPUs), and so on.

The computing functionality 2002 can also include any storage resources 2006 for storing any kind of information, such as code, settings, data, etc. Without limitation, for instance, the storage resources 2006 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 2002. The computing functionality 2002 may perform any of the functions described above when the processing devices 2004 carry out instructions stored in any storage resource or combination of storage resources.

As to terminology, any of the storage resources 2006, or any combination of the storage resources 2006, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 2002 also includes one or more drive mechanisms 2008 for interacting with any storage resource, such as a hard disk drive mechanism, an optical disk drive mechanism, and so on.

The computing functionality 2002 also includes an input/output module 2010 for receiving various inputs (via input devices 2012), and for providing various outputs (via output devices 2014). The input devices 2012 can include any of key entry devices, mouse entry devices, touch-enabled entry devices, voice entry devices, and so on. One particular output mechanism may include a presentation device 2016 and an associated graphical user interface (GUI) 2018. The computing functionality 2002 can also include one or more network interfaces 2020 for exchanging data with other devices via one or more networks 2022. One or more communication buses 2024 communicatively couple the above-described components together.

The network(s) 2022 can be implemented in any manner, e.g., by a local area network, a wide area network (e.g., the Internet), point-to-point connections, etc., or any combination thereof. The network(s) 2022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2002 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described above can employ various mechanisms to ensure the privacy of user data maintained by the functionality, in accordance with user expectations and applicable laws of relevant jurisdictions. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by one or more computing devices of a network-accessible social network system, the method comprising:
providing social network feature functions to a first application;
receiving a first set of social networking posts originating from the first application;
tagging the first set of social networking posts with a first application-specific tag associating the first set of social networking posts with the first application that submitted the first set of social networking posts to the network-accessible social networks system;
storing a plurality of social networking posts including the first set of social networking posts originating from the first application and having the first application-specific tag;
integrating a second application with the network-accessible social network system by providing the social network feature functions to the second application;
receiving a second set of social networking posts originating from the second application;
tagging the second set of social networking posts with a second application-specific tag associating the second set of social networking posts with the second application that submitted the second set of social networking posts to the network-accessible social network system;
storing the second set of social networking posts originating from the second application and having the second application-specific tag;
receiving a request from the first application installed on a user device on which the second application is not installed, the request including an identification of the second application and being generated in response to a particular user interacting with an application-based filtering control displayed by the first application to select the second application;
responsive to receiving the request, filtering the plurality of social networking posts based at least on the identification of the second application and the second application-specific tag to identify the second set of social networking posts; and
sending the second set of social networking posts over a network from the network-accessible social network system to the first application on the user device.

2. The method of claim 1, further comprising:
receiving another request including an identification of the first application from the first application on the user device;
filtering the plurality of social networking posts based at least on the identification of the first application and the first application-specific tag to identify the first set of social networking posts; and
sending the first set of social networking posts over the network from the network-accessible social network system to the first application on the user device.

3. The method of claim 1, further comprising:
detecting that the particular user of the user device interacting with the first application has manipulated the application-based filtering control to turn off application-based filtering of the social networking posts; and
responsive to detecting that the application-based filtering is turned off, sending, from the network-accessible social network system to the first application on the user device, at least the first set of social networking posts.

4. The method of claim 1, further comprising:
receiving the first set of social networking posts via a first channel of the network-accessible social networks system;
tagging the first set of social networking posts received via the first channel with the first application-specific tag;
receiving the second set of social networking posts via a second channel of the network-accessible social network system; and
tagging the second set of social networking posts received via the second channel with the second application-specific tag.

5. The method of claim 4, wherein the identification of the second application comprises a channel-specific code sent over the network from the user device to the network-accessible social network system.

6. The method of claim 1, wherein the identification of the second application comprises an application-specific Uniform Resource Locator used by the user device to access the network-accessible social network system.

7. The method of claim 1, further comprising:
maintaining a single identity for the particular user when the particular user accesses the network-accessible social network system via a plurality of application-specific Uniform Resource Locators.

8. The method of claim 1, further comprising:
detecting, by the network-accessible social network system, whether the particular user has selected a user-based filtering control on the user device for selecting user-based filtering of the plurality of social networking posts, the particular user having selected the second application via the application-based filtering control;
when the particular user has not selected user-based filtering via the user-based filtering control, including other posts provided by other users who are not contacts of the particular user in the second set of social networking posts sent from the network-accessible social network system to the user device; and
when the particular user has selected user-based filtering via the user-based filtering control, removing the other posts provided by the other users who are not contacts of the particular user from the second set of social networking posts sent from the network-accessible social network system to the user device.

9. The method of claim 8, further comprising:
sending, from the network-accessible social network system to the user device, a user interface presentation that displays the application-based filtering control and the user-based filtering control concurrently on the user device.

10. The method of claim 1, further comprising:
maintaining an application-specific social graph for the second application.

11. The method of claim 10, further comprising:
tagging nodes of the application-specific social graph with identifications of the second application with which the nodes are associated.

12. The method of claim 11, further comprising:
receiving application-specific designations associated with certain users of the network-accessible social network system.

13. The method of claim 12, wherein the application-specific social graph comprises a sub-graph of a full social graph maintained by the network-accessible social network system.

14. The method of claim 1, further comprising:
filtering contacts of the particular user to identify a community of users who are affiliated with the second application that the particular user has selected for application-based filtering.

15. The method of claim 14, further comprising:
identifying at least one notification, generated by the network-accessible social network system, that pertains to: (a) the particular user; (b) the second application; and (c) another user from the community of users; and
sending the at least one notification from the network-accessible social network system to the user device of the particular user in a course of interaction, by the particular user, with the first application.

16. The method of claim 1, further comprising:
receiving a particular user-generated social networking post created by the particular user in a course of interaction by the particular user with the first application;
tagging the particular user-generated social networking post with the first application-specific tag; and
storing the particular user-generated social networking post with the first application-specific tag.

17. A social network system comprising:
one or more processing devices; and
at least one computer readable storage medium storing computer readable instructions which, when executed by the one or more processing devices, cause the one or more processing devices to:
provide social networking feature functions to applications including a first application and a second application:
designate users of the social network system as having associations with the applications;
when user-generated social networking posts are received by the social network system over a network from different user devices of different users associated with different applications, tag the user-generated social networking posts with application-specific tags identifying respective applications with which the different users are associated, the user-generated social networking posts including a first set of user-generated social networking posts received from the first application and tagged with a first application-specific tag and a second set of user-generated social network posts receive from the second application and tagged with a second application-specific tag;
store the user-generated social networking posts and the application-specific tags in a data store of the social network system;
when a particular user uses the first application installed on a particular user device to access the social network system and requests an application-specific presentation of the social network system for the second application that is not installed on the particular user device, filter the user-generated social networking posts in the data store of the social network system based at least on the second application-specific too identify the second set of user-generated social networking posts that are tagged with the second application-specific tag, at least some of the user-generated social networking posts being generated by designated contacts of the particular user; and
send the second set of user-generated social networking posts over the network from the social network system to the first application on the particular user device.

18. A social network system comprising:
at least one processing device; and
at least one computer-readable storage medium storing instructions which, when executed by the at least one processing device, cause the at least one processing device to:
integrate a first application and a second application with the social network system by providing social network feature functions to the first application and the second application;
receive a plurality of social networking posts including a first set of social networking posts originating from the first application and a second set of social networking posts originating from the second application;
tag the first set of social networking posts with a first application-specific tag and the second set of social networking posts with a second application-specific tag;
store the plurality of social networking posts provided by a plurality of users of the social network system using a plurality of user devices, the plurality of social networking posts being received by the social network system from the plurality of user devices over a network;
receive, over the network, an indication that an individual user of the social network system has selected a filtering control in the first application installed on an individual user device, the filtering control allowing the individual user to select application-specific filtering of the plurality of social networking posts for the second application not installed on the individual user device; and
responsive to receiving the indication that the individual user selected the second application via the filtering control, filter the plurality of social networking posts based at least on the second application-specific tag to identify a subset of social networking posts that includes the second set of social networking posts and excludes at least some other application-specific social networking posts associate with another application and send the subset of social networking posts over the network from the social network system to the individual user device to be displayed to the individual user interacting with the first application.

19. The social network system of claim 18, wherein the at least some other application-specific social networking posts associated with the another application include at least one other social networking post that is provided by an individual designated contact of the individual user and that is not sent to the individual user device with the subset of social networking posts.

20. The social network system of claim 19, wherein the instructions, when executed by the at least one processing device, cause the at least one processing device to:
in an instance when the individual user has not selected application-specific filtering via the filtering control, send the at least some other application-specific social networking posts over the network to the individual user device.

* * * * *